M

(12) United States Patent
Paulino

(10) Patent No.: US 9,676,169 B2
(45) Date of Patent: Jun. 13, 2017

(54) BIAXIALLY ORIENTED HIGH DENSITY POLYETHYLENE FILM WITH IMPROVED SEALANT LAYER

(71) Applicant: TORAY PLASTICS (AMERICA), INC., North Kingstown, RI (US)

(72) Inventor: Claudio M Paulino, South Kingstown, RI (US)

(73) Assignee: TORAY PLASTICS (AMERICA), INC., North Kingstown, RI (US)

( * ) Notice: Subject to any disclaimer, the term of this patent is extended or adjusted under 35 U.S.C. 154(b) by 125 days.

(21) Appl. No.: 14/448,640

(22) Filed: Jul. 31, 2014

(65) Prior Publication Data

US 2016/0031191 A1 Feb. 4, 2016

(51) Int. Cl.
*B32B 27/08* (2006.01)
*B32B 27/32* (2006.01)
*B32B 27/18* (2006.01)
*B32B 15/085* (2006.01)
*B32B 15/08* (2006.01)

(52) U.S. Cl.
CPC .............. *B32B 27/08* (2013.01); *B32B 27/18* (2013.01); *B32B 27/32* (2013.01); *B32B 15/08* (2013.01); *B32B 15/085* (2013.01); *B32B 2270/00* (2013.01); *B32B 2307/31* (2013.01); *B32B 2307/406* (2013.01); *B32B 2307/412* (2013.01); *B32B 2307/414* (2013.01); *B32B 2307/518* (2013.01); *B32B 2307/54* (2013.01); *B32B 2307/704* (2013.01); *B32B 2439/00* (2013.01); *B32B 2451/00* (2013.01); *B32B 2519/00* (2013.01)

(58) Field of Classification Search
CPC ......... B32B 27/06; B32B 27/08; B32B 15/08; B32B 15/085; B32B 2270/00; B32B 2307/31; B32B 2307/406; B32B 2307/412; B32B 2307/414; B32B 2307/518; B32B 2307/54; B32B 2307/704; B32B 2439/00; B32B 2451/00; B32B 2519/00
USPC ................................................. 428/212, 220
See application file for complete search history.

(56) References Cited

U.S. PATENT DOCUMENTS

| 4,963,622 | A | * | 10/1990 | Heitz | ............... C08J 5/18 525/227 |
| 5,302,442 | A | * | 4/1994 | O'Brien | ............... B32B 27/32 428/213 |
| 5,536,542 | A | † | 7/1996 | Gillespie | |
| 7,125,933 | B2 | † | 10/2006 | German | |
| 7,491,762 | B2 | † | 2/2009 | Wolters | |
| 2007/0092747 | A1 | * | 4/2007 | Kato | ............... C08K 5/526 428/500 |
| 2009/0258243 | A1 | * | 10/2009 | Maruyama | ............... B32B 27/32 428/523 |
| 2012/0101209 | A1 | † | 4/2012 | Khanna | |

OTHER PUBLICATIONS

Milliken & Company, Webpage from Milliken & Company's Website, May 5, 2014, WayBack Machine [5 cont.] <http://web.archive.org/web/20140505131701/http://millikenchemical.com/why-polyethylene/> (visited Mar. 21, 2016).
Darin L. Dotson, A Novel Nucleating Agent for Polyethylene, TAPPI Press, Red Hook, NY [6 cont.] <http://www.tappi.org/content/events/07place/papers/dotson.pdf> (visited Mar. 21, 2016).
Milliken & Company, Webpage from Milliken & Company's Website, May 5, 2014, WayBack Machine <http://web.archive.org/web/20140505131701/http://millikenchemical.com/why-polyethylene/> (visited Mar. 21, 2016).†
Darin L. Dotson, A Novel Nucleating Agent for Polyethylene, TAPPI Press, Red Hook, NY <http://www.tappi.org/content/events/07place/papers/dotson.pdf> (visited Mar. 21, 2016).†

\* cited by examiner
† cited by third party

*Primary Examiner* — Aaron Austin
*Assistant Examiner* — Lawrence Ferguson
(74) *Attorney, Agent, or Firm* — Pillsbury Winthrop Shaw Pittman LLP

(57) ABSTRACT

A multi-layer biaxially oriented high density polyethylene (OHDPE) film with a novel formulation which exhibits superior heat seal properties is disclosed. This improved formulation comprises a blend of a single grade of high density polyethylene (HDPE) or several grades of high density polyethylene (HDPE) with a nucleating agent (NA) used in the core layer to achieve a lower sealing initiation temperature, higher heat seal strength and broader sealing temperature range HDPE-based film that still exhibits typical properties of OHDPE films and a lower haze than conventional OHDPE films. The multi-layer BOPP film has additional layers such as a third polyolefin resin-containing layer, a metal layer, or combinations thereof.

18 Claims, No Drawings

BIAXIALLY ORIENTED HIGH DENSITY POLYETHYLENE FILM WITH IMPROVED SEALANT LAYER

FIELD OF INVENTION

This invention relates to a multi-layer biaxially oriented polyethylene (OHDPE) film with a novel formulation which exhibits improved heat sealing properties, i.e., a lower sealing initiation temperature (SIT) and higher seal strength. This improved formulation comprises a blend of high density polyethylene (HDPE) resins with a nucleating agent (NA) used in the core layer and a blend of linear low density polyethylene (LLDPE) with a polyolefin co-monomer elastomer in the sealant layer to achieve a oriented polyethylene (OHDPE) film that exhibits superior sealing properties.

BACKGROUND OF INVENTION

Biaxially oriented high density polyethylene (OHDPE) films used for packaging, decorative, and label applications often perform multiple functions. It must perform in a lamination to provide printability, transparent or matte appearance, or slip properties; it sometimes must provide a surface suitable for receiving organic or inorganic coatings for gas and moisture barrier properties; it sometimes must provide a heat sealable layer for bag forming and sealing, or a layer that is suitable for receiving an adhesive either by coating or laminating.

Heat seal ability can be achieved by liquid coating a heat sealable skin on top of the core layer of the OHDPE film or by extrusion coating a heat sealable skin on top of the core layer of the OHDPE film, but these processes usually require special treatments on the receiving surface of the OHDPE film, and/or a tie layer between the OHDPE core and the heat seal layer, which add cost and complexity to the manufacturing process, and often may sacrifice other properties of the OHDPE film such as gloss and haze. Another way to obtain heat sealability in BOPP films is by co-extrusion of a heat sealable skin on top of a core layer of the OHDPE film, but the heat seal strength obtained in such cases is generally low and limited to a narrow temperature range.

U.S. Pat. No. 5,302,442 describes a heat sealable OHDPE film formulation using a heat seal formulation of about 15-50 wt % of a random terpolymer of ethylene-propylene-butene, about 10-50 wt % of low density polyethylene and about 10-50 wt % of polybutene homopolymer or copolymer, co-extruded to the HDPE core. However, the film has a heat seal strength limited to 500 grams per inch.

U.S. Pat. No. 4,564,558 describes a heat sealable OHDPE film formulation comprising a polyolefin film substrate, a layer of a terpolymer of ethylene, propylene and 1-butene, a primer layer on said terpolymer layer and a heat sealable layer on said primer layer, where the heat seal strength reached values above 800 g/in. However, the film requires a primer coating on the terpolymer layer and a subsequent heat seal coating on top of the primer coating, which add cost and complexity to the process.

There remains a need in the art for new and improved methods for making OHDPE films with new and improved heat sealing properties. The inventor has found a solution that improves the attribute of heat sealability of the OHDPE film by adding an amount from 1-9 wt % of a nucleating agent to the core layer of the film, while also maintaining the optical properties of the OHDPE film, i.e., haze and gloss of the film.

SUMMARY OF THE INVENTION

It is the objective of this invention to provide a method for improving heat seal properties of a OHDPE film by using a blend of high density polyethylene (HDPE) resins and a nucleating agent without sacrificing optical properties such as transparency and clarity of the film, coefficient of friction, and other desirable mechanical properties. This inventive film can provide a lower seal initiation temperature (SIT) and a wider heat seal range than conventional OHDPE films, thus allowing a wider choice of processing conditions at the converting operations such as lamination and package forming.

One embodiment is a laminate film comprising a first polyolefin resin-containing core layer of a resin formulation comprised of high density polyethylene or a blend of different grades of high density polyethylene to which an amount of a nucleating agent is added. This core or base layer not only provides the bulk strength of the laminate film, but also imparts a major portion of the haze of the laminate. The laminate further comprises a second polyolefin resin-containing layer on one side of said core layer. This second polyolefin resin-containing layer could be considered a sealable layer of this laminate and is comprised of either a low density polyethylene or a linear low density polyethylene or blends thereof. In another embodiment this second polyolefin resin-containing layer is comprised of either a low density polyethylene or a linear low density polyethylene combined with a propylene ethylene elastomer or blends thereof. In yet another embodiment this second polyolefin resin-containing layer is comprised of either a low density polyethylene or a linear low density polyethylene combined with a ethylene butene elastomer or blends thereof. Furthermore, the laminate could further comprise a third polyolefin resin-containing layer on the first polyolefin resin-containing core layer opposite the side with the sealable layer.

Preferably, the third polyolefin resin-containing layer comprises a high density polyethylene, a blend of different grades of high density polyethylene or a blend of high density polyethylene and other olefins. This third polyolefin resin-containing layer can also comprise an antiblock component selected from the group consisting of amorphous silicas, aluminosilicates, sodium calcium aluminum silicates, crosslinked silicone polymers, and polymethylmethacrylates to aid in machinability and winding. Preferably, the third polyolefin layer is a discharge-treated layer having a surface for lamination, metallizing, printing, or coating with adhesives or inks.

In the embodiment of a 2-layer laminate structure wherein a sealable layer is contiguous with the high density polyethylene-comprising core layer, it is preferable to discharge-treat the side of the core layer opposite the sealable layer for purposes of laminating, printing, metallizing, coating, etc., while leaving the opposite side treated or untreated as desired.

In the case of a film structure comprising three layers, such as said third polyolefin layer on one side of the HDPE-comprising core layer, it is preferable to discharge-treat the side of this third layer opposite the core layer for lamination, metallizing, printing, or coating etc.

Discharge-treatment in the above embodiments can be accomplished by several means, including but not limited to corona, flame, plasma, or corona in a controlled atmosphere of selected gases. Preferably, in one variation, the discharge-treated surface has a corona discharge-treated surface formed in an atmosphere of $CO_2$ and $N_2$ gases to the exclusion of O2 gas. The laminate film embodiments could further comprise a vacuum-deposited metal layer on the discharge-treated layer's surface. Preferably, the metal layer has a thickness of about 5 to 100 nm, has an optical density of about 1.5 to 5.0, and comprises aluminum. In one variation, the laminate film is an extruded laminate film.

Preferably, the laminate film is produced via coextrusion of the sealable layer blend and the HDPE core layer and/or other layers through a compositing die whereupon the molten multilayer film structure is quenched upon a chilled casting roll system or casting roll and water bath system and subsequently oriented in the machine and transverse direction into a multi-layer film.

All these examples can also be metallized via vapor-deposition, such as titanium, vanadium, chromium, maganese, iron, cobalt, nickel, copper, zinc, aluminum, gold, or palladium; preferably a vapor-deposited aluminum layer is used, with an optical density of at least about 1.5, preferably with an optical density of about 2.0 to 4.0, and even more preferably between 2.3 and 3.2.

Optionally, an additional layer specifically formulated for metallizing to provide adequate metal adhesion and gas barrier properties can be disposed on the first polyolefin resin-containing core substrate layer, opposite the side with the sealable blend layer. Additionally, this additional layer's surface may also be modified with a discharge treatment to make it suitable for metallizing, laminating, printing, or converter applied adhesives or other coatings.

This invention provides a method that utilizes high density polyethylene or blends of different grades of high density polyethylene combined with an amount of nucleating agent in the core layer of the film that surprisingly and unexpectedly improves heat seal properties, allows good clarity and transparency, maintains good mechanical properties and low coefficient of friction, and is a lower cost option than expensive coatings generally used to achieve lower seal initiation temperatures, broader seal range and higher sealing strengths of prior art biaxially oriented polyethylene films. The invention helps solve the low seal strength and narrow seal range problems associated with the prior art of bi-oriented high density polyethylene substrates in packaging applications.

Additional advantages of this invention will become readily apparent to those skilled in the art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the examples and description are to be regarded as illustrative in nature and not as restrictive.

DETAILED DESCRIPTION OF THE INVENTION

In one embodiment of the invention, the laminate film comprises a 2-layer coextruded film of: a first polyolefin resin-containing core layer (B) comprising a single grade of HDPE or a blend of different grades of HDPE (as distinguished by different melt indexes and/or molecular weight distributions, single modal or bi-modal molecular weight distributions, and/or densities); and a nucleating agent (NA), the amount of NA used is from about 0.04% to about 0.36% by weight of the total weight of the core layer, preferably about 0.08 wt % to 0.12 wt % of the core layer; a second polyolefin-containing heat sealable layer (C) comprising of linear low density polyethylene and a polyolefin co-monomer elastomer disposed on one side of the said first core layer (B); and the side of the core layer (B) opposite the heat sealable layer (C) is discharge-treated.

The high density polyethylene resin in the core layer (B) is a high density polyethylene homopolymer such as Total Petrochemical's HDPE 9658 (density 0.958 g/cc, MI 0.64 g/10 min), or Total Petrochemical HDPE 9458 (density 0.958 g/cc, MI 0.45 g/10 min), or Total Petrochemical HDPE 9260 (density 0.960 g/cc, MI 2.0 g/10 min), or blends thereof. The core resin layer (B) is typically 5 µm to 100 µm in thickness after biaxial orientation, preferably between 10 µm and 50 µm, and more preferably between 15 µm and 30 µm in thickness. A preferred embodiment is to combine two or more of the HDPE grades in order to achieve a balance of processability and film properties.

The nucleating agents (NA) added to a polyolefin film of an embodiment herein accelerates crystallization of the polyolefin, increases the crystallization temperature and crystallization onset temperature, and also imparts formation of smaller size crystals, which in turn reduce the haze of these films due to the fact that smaller crystals scatter less light than larger crystals. Also, the addition of nucleating agent in the polyolefin film of an embodiment herein improved the heat seal performance of the co-extruded film. Without being bound by any theory, it is hypothesized that the accelerated crystallization caused by the nucleating agent provides a stronger interface between the HDPE core and the adjacent heat seal layer. When heat is applied to the co-extruded film to form a heat seal, the HDPE core and the HDPE core/heat seal interface initiate crystallization more rapidly, due to the higher onset crystallization temperature, and the stronger interface between the HDPE core and the adjacent heat seal layer enables the heat seal layer to have a stronger heat seal strength.

Also, surprisingly found is that the addition of a nucleating agent to the HDPE core does not substantially change the melting temperature of the bi-oriented film, but it causes a substantial reduction in the melting onset temperature of these films, which explains the reduction of the seal initiation temperature and the broader temperature range observed on these films, as detailed in the examples and Table 1 shown under Examples. A reduction in the sealing initiation temperature (SIT) is desired in the downstream converting operations because it enables the equipment to perform the seals at a lower temperature, which in turn enables the equipment to run at faster production speeds, lower energy usage, and thus reducing production costs. A reduction in the SIT of the heat sealable film thus results in a broader sealing range for the use of the film in packaging applications.

Suitable grades of the nucleating agent (NA) added in the polyolefin film such as the core layer (B) in order to impart these improvements in heat seal performance on the heat seal skin layer (C) are, for example, Milliken Hyperform® Concentrate HL3-4, which is a masterbatch containing 4 wt % of the Hyperform® HPN-20E organic salt nucleating agent in a LDPE carrier of MI 6.0 g/10 min; or Entec Crystaladd® HM-237B, which is a masterbatch containing 4 wt % of the Hyperform® HPN-20E nucleating agent in a LLDPE carrier of MI 5.2 g/10 min.

According to the Materials Safety Data Sheet of Hyperform® HPN-20E, it contains zinc stearate (34 wt. %) and calcium salt of 1,2-cyclohexanedicarboxylic acid (66 wt. %); is a white, odorless powder, slightly soluble in water, and having a melting point of 120° C.

The amount of NA used is from about 0.04% to about 0.36% by weight of the total weight of the core layer, preferably about 0.08 wt % to 0.12 wt % of the core layer.

The core resin layer (B) can be surface treated on one side with an electrical corona-discharge treatment method, flame treatment, atmospheric plasma, or corona discharge in a controlled atmosphere of nitrogen gas, carbon dioxide gas, or a mixture thereof, with oxygen gas excluded and its presence minimized. The latter method of corona treatment in a controlled atmosphere of a mixture of nitrogen and carbon dioxide gases—to the exclusion of oxygen gas—is particularly preferred. This method results in a treated surface that comprises nitrogen-bearing functional groups, preferably at least 0.3 atomic % or more, and more preferably, at least 0.5 atomic % or more. This treated surface of core layer (B) is then well suited for subsequent purposes of metallizing, printing, coating, or laminating.

In this embodiment of a 2-layer laminate film, it is often desirable to add an optional amount of antiblocking agent to the core layer (B) for aiding machinability and winding. The inorganic antiblock agent can be added in the amount of 100-1000 ppm of the core resin layer (B), preferably 300-600 ppm. Preferred types of antiblock are spherical sodium aluminum calcium silicates or an amorphous silica of nominal 3 μm average particle diameter, but other suitable spherical inorganic antiblocks can be used including crosslinked silicone polymer or polymethylmethacrylate, and ranging in size from 2 μm to 6 μm. Migratory slip agents such as fatty amides and/or silicone oils can also be optionally employed in the core layer (B) either with or without the inorganic antiblocking additives to aid further with controlling coefficient of friction and web handling issues. Suitable types of fatty amides are those such as stearamide or erucamide and similar types, in amounts of 100-1000 ppm of the core. Preferably, stearamide is used at 400-600 ppm of the core layer (B). Suitable silicone oil that can be used is a low molecular weight oil of 350 centistokes which blooms to the surface readily at a loading of 400-600 ppm of the core layer (B). However, if the heat sealable films of this invention are desired to be used for metallizing or high definition process printing, it is recommended that the use of migratory slip additives be avoided in order to maintain metallized barrier properties and adhesion or to maintain high printing quality in terms of ink adhesion and reduced ink dot gain.

The heat sealable skin layer (C) is comprised of a metallocene linear low density polyethylene (LLDPE) blended with a polyolefin co-monomer elastomer. Suitable LLDPE grades are such as ExxonMobil Exceed® 4518PA (density 0.918 g/cc, MI 4.5 g/10 min), and ExxonMobil Exceed® 3812CB (density 0.912 g/cc, MI 3.8 g/10 min). Suitable polyolefin co-monomer elastomer grades are such as ExxonMobil Vistamaxx® 3980FL propylene ethylene elastomer (density 0.878 g/cc, MFR 8.0 g/10 min) and ExxonMobil Exact® 4049 ethylene butene elastomer (density 0.873 g/cc, MI 4.5 g/10 min). The heat sealable skin layer (C) also can include an amount of Momentive Tospearl® 120 nominal 2.0 μm spherical crosslinked silicone polymer antiblock of about 1000-5000 ppm loading, preferably about 4000 ppm loading. Other suitable inorganic antiblock particles can also be used such as spherical sodium aluminum calcium silicates, an amorphous silica of nominal 3 μm average particle diameter, other suitable spherical inorganic antiblocks such as crosslinked silicone polymer or polymethylmethacrylate, and ranging in size from 2 μm to 6 μm, or combinations thereof. Migratory slip agents such as fatty amides or silicone oils can also be optionally added to the sealable skin layer (C) of types and quantities mentioned previously if lower COF is desired. However, if the heat sealable films of this invention are desired to be used for metallizing or high definition process printing, it is recommended that the use of migratory slip additives be avoided or minimized in order to maintain metallized barrier properties and metal adhesion or to maintain high printing quality in terms of ink adhesion and reduced ink dot gain.

The heat sealable resin blend layer (C) can be coextruded on one side of the core layer, said layer having a thickness after biaxial orientation of between 0.1 and 5 μm, preferably between 0.5 and 3 μm, and more preferably between 1.0 and 2.0 μm. The core layer (B) thickness can be of any desired thickness after biaxial orientation, but preferred and useful thicknesses are in the range of 8 μm to 100 μm, preferably 10 μm to 50 μm, and even more preferably 15 μm-30 μm. The coextrusion process includes a multi-layered compositing die, such as a two-, three-, or four-layer die. In the case of a 2-layer coextruded film, a two-layer compositing die can be used. In the case of a 3-layer coextruded film, the polymer core layer (B) can be sandwiched between the sealable resin layer (C) and a third layer (A) using a three-layer compositing die. One embodiment is to coextrude in only two layers with only the core layer (B) and the heat sealable layer (C) coextruded on one side of the core layer (B). In this case, the core layer (B) side opposite the sealable layer (C) can be further modified by adding inorganic antiblock particles into the core layer (B) itself and can also be surface-treated via a discharge-treatment method if so desired. In a three-layer coextruded film embodiment, this third layer (A) on the side of the core layer opposite the sealable layer (A) can also be modified with antiblock particles in lieu of the core layer (B) and also be surface-treated via a discharge-treatment method as desired. Selection of the said third layer (A) can be any polymer typically compatible with the core layer (B) such as a single grade of high density polyethylene, blends of different grades of high density polyethylene or blends of high density polyethylene and other olefins such as propylene, butene and hexene. Typically, selection of this third layer (A) is to enhance the coextruded film's printability, appearance, metallizability, winding, laminating, sealability, or other useful characteristics. Useful thickness of this third layer (A) after biaxial orientation can be similar to the thicknesses cited for the sealable skin layer (C).

This third layer (A) can be comprised substantially of a high density polyethylene such as Total HDPE 9260 (density 0.960 g/cc, MI 2.0 g/10 min). The skin layer (A)—which can be used as a metal receiving layer or print receiving layer—can optionally include an amount of antiblock or antiblock masterbatch to aid in web handling.

Typical amounts of inorganic antiblock can be up to 1000 ppm of the metal receiving layer (A) (preferably, 300-600 ppm) and can comprise of silicas, amorphous sodium calcium aluminum silicates, PMMA, or crosslinked silicone polymer of nominal 1.0-6.0 μm particle size, preferably 2.0-3.0 μm particle size. Suitable antiblock used in this third layer (A) is such as Mizusawa Silton® JC-30 nominal 3.0 μm spherical sodium calcium aluminum silicate, at about 300 ppm loading.

The surface of the skin layer (A) opposite the sealable layer (C) can be surface-treated if desired with either a corona-discharge method, flame treatment, atmospheric plasma, or corona discharge in a controlled atmosphere of nitrogen gas, carbon dioxide gas, or a mixture thereof, which excludes oxygen gas. The latter treatment method in a mixture of CO2 and N2 gases is preferred. This method of discharge treatment results in a treated surface that comprises nitrogen-bearing functional groups, preferably 0.3% or more nitrogen in atomic %, and more preferably 0.5% or more nitrogen in atomic %. This discharge-treated surface can then be metallized, printed, coated, or extrusion or adhesive laminated. Preferably, it is printed or metallized.

If a three-layer coextruded film embodiment is chosen, said third layer (A) may be coextruded with the core layer (B) opposite the sealable layer (C), having a thickness after biaxial orientation between 0.5 and 5 μm, preferably between 0.5 and 3 μm, and more preferably between 0.5 and 1.0 μm. As discussed previously, this third layer (A) may contain an anti-blocking agent and/or slip additives for good machinability and a low coefficient of friction in about 0.05-0.5% by weight of the third layer. Preferably, non-migratory slip and antiblock additives should be used to maintain gas barrier properties and metal adhesion if metallizing, or ink wetting and ink adhesion if printing.

Optionally, as a basefilm for metallization, the rolls can be placed inside a vacuum chamber metallizer for vapor deposition metallization using preferably aluminum which is well known in the art, although other metals such as titanium, vanadium, chromium, maganese, iron, cobalt, nickel, copper, zinc, gold, or palladium may be used. Aluminum deposition is to be made on the surface of the skin layer (A) comprised of Total HDPE 9260. The film then passes into the high vacuum deposition chamber of the metallizer which is metallized using aluminum to a nominal optical density target of 2.4. Optical densities for aluminum deposition can range from 2.0 to 5.0; preferably the OD range is 2.2-3.2. The metallized roll is then slit on a film slitter and tested for properties.

Test Methods

The various properties in the examples were measured by the following methods:
- A) Haze is the percent of transmitted light that is scattered more than 2.5° from the direction of the incident beam and was measured on 1 sheet of film substantially in accordance with ASTM D1003. Materials with haze values greater than 30% are considered diffusing.
- B) Gloss of the film was measured by measuring the desired side of a single sheet of film via a surface reflectivity gloss meter (BYK Gardner Micro-Gloss) substantially in accordance with ASTM D2457. The C-side or heat sealant layer side of the film was measured at a 20° angle.
- C) Tensile properties such as Young's modulus, ultimate strength, and elongation are measured substantially in accordance with ASTM D882 in both the machine direction (MD) and transverse direction (TD) of the film.
- D) Heat seal strength was measured by using a Sentinel sealer model 12 ASL at 20 psi, 0.5 second dwell time, with heated flat upper seal jaw Teflon™ coated, and unheated lower seal jaw, rubber with glass-cloth covered. The film sample is heat-sealed sealable-side to sealable-side at various desired seal temperatures in the Sentinel sealer (e.g. 240° F. or 115° C.) or at desired temperature increments (e.g. 10° F. or 5.56° C. increments) from 190° F. (65.56° C.) to 290° F. (143.3° C.) and then the respective seal strengths are measured using an Instron model 4201 tensile tester. The heat-sealed film samples are cut into 1-inch wide strips, the two unsealed tails placed in the upper and lower Instron clamps, and the sealed tail supported at a 90° angle to the two unsealed tails for a 90° T-peel test. The peak and average seal strength is recorded. The preferred peak value is minimum 100 On or more at 115° C. (240° F.) seal temperature.
- E) Seal Initiation Temperature (SIT) is determined by measuring the lowest sealing temperature at which a minimum of 200 g/inch seal strengths are obtained by using the heat seal strength method and conditions described in (D) above. Desired values for SIT are less than 212° F. (100° C.), and preferably less than 200° F. (ca. 93° C.).
- F) Crystallization temperature, heat of crystallization, melting temperature and heat of fusion were measured via Differential Scanning calorimetry by using a Universal Q1000 TA Instruments calorimeter substantially in accordance with ASTM 3418-08. Preferably, crystallization temperature is 120° C. or higher; onset of crystallization is 120° C. or higher; and onset of melting temperature is less than 122° C.

EXAMPLES

This invention will be better understood with reference to the following Examples, which are intended to illustrate specific embodiments within the overall scope of the invention.

Example 1

A 3-layer OHDPE film was made using a 1.5 m wide pilot line sequential biaxial orientation process with a film structure consisting of: a core layer (B) comprising of a blend of about 50 wt % Total 9658 HDPE and 50 wt % Total 9260 HDPE of the total weight of the core layer (B); a skin layer (A) comprising of Total 9260 HDPE with an amount of Mizusawa Silton® JC-30 nominal 3.0 μm spherical sodium calcium aluminum silicate antiblock of about 300 ppm loading on one side of the core layer (B); and a heat sealable layer (C) comprising of a blend of about 65.5 wt % ExxonMobil Exceed® 4518PA linear low density polyethylene and about 30 wt % ExxonMobil Vistamaxx® 3980FL propylene ethylene elastomer with about 4.5 wt % of an antiblock masterbatch containing about 10 wt % Momentive Tospearl® 120 nominal 2.0 μm spherical crosslinked silicone polymer antiblock in a low density polyethylene carrier resin (which gives an active antiblock loading of about 4500 ppm of the layer) on the side of the core layer (B) opposite the skin layer (A); via coextrusion through a die, cast on a chill drum using an air knife pinner, oriented in the machine direction at about 3.50 times through a series of heated and differentially sped rolls, followed by transverse direction stretching in a tenter oven of about 10 times.

The multilayer coextruded laminate sheet was coextruded at processing temperatures of ca. 225° C. to 230° C. through a die and cast onto a cooling drum whose surface temperature was controlled between 35° C. and 85° C. to solidify the non-oriented laminate sheet at a casting speed of about 8-13 mpm. The non-oriented laminate sheet was preheated in the machine direction orienter at about 75° C. to 125° C., stretched in the longitudinal direction at about 120° C. to 125° C. at a stretching ratio of about 3.50 times the original length and the resulting stretched sheet was annealed at about 20° C. to 95° C. to reduce heat shrinkage and to obtain a uniaxially oriented laminate sheet. The uniaxially oriented laminate sheet was introduced into a tenter at a line speed of ca. 24 to 40 mpm and preliminarily heated between about 135° C. and 140° C., and stretched in the transverse direction at about 125° C. to 130° C. at a stretching ratio of about 10 times the original width and then heat-set or annealed at about 105° C. to 115° C. to reduce internal stresses due to the orientation and minimize thermal shrinkage of the final film and give a relatively thermally stable biaxially oriented sheet.

After biaxial orientation, the thickness of the coextruded film overall was nominal 70G (17.5 μm); the sealant layer (C) was nominal 8G (2.0 μm); the skin layer (A) was nominal 4G (1.0 μm); and the core layer was nominal 58G (14.5 μm). Main layer extruder output was adjusted to maintain finished film thickness of 70G (17.5 μm) after orientation as needed. The film was heat-set or annealed in the final zone of the tenter oven to reduce internal stresses and minimize heat shrinkage of the film and maintain a dimensionally stable biaxially oriented film. The side of the skin layer A on the core layer opposite the sealable skin layer was treated via corona discharge treatment method after orientation. The OHDPE multi-layer film was wound in roll form.

Example 2

Example 1 was repeated except that the core layer (B) blend was changed to 50 wt % Total 9658 HDPE, 48 wt % Total 9260 HDPE and 2 wt % Milliken Hyperform® Concentrate HL3-4 nucleating agent masterbatch. The active amount of the nucleating agent was about 0.08 wt % of the core layer (based on the Milliken Hyperform® masterbatch nucleating agent loading of 4 wt % of the masterbatch).

Example 3

Example 1 was repeated except that the core layer (B) blend was changed to 50 wt % Total 9658 HDPE, 48 wt % Total 9260 HDPE and 2 wt % Milliken Hyperform® Concentrate HL3-4 nucleating agent; and the heat seal skin layer (C) composition was changed to 60.5 wt % ExxonMobil Exceed® 3812CB linear low density polyethylene and about 35 wt % ExxonMobil Exact® 4049 ethylene butene elastomer with the same amount of Momentive Tospearl® 120 nominal 2.0 μm spherical crosslinked silicone polymer antiblock of about 4500 ppm loading (using about 4.5 wt % of the antiblock masterbatch). The active amount of the nucleating agent was about 0.08 wt % of the core layer (based on the Milliken Hyperform® masterbatch nucleating agent loading of 4 wt % of the masterbatch).

Comparative Example 1

Example 1 was repeated except that the core layer (B) composition was changed to 50 wt % Total 9658 HDPE, 48 wt % Total 9260 HDPE and 2 wt % Chevron MarFlex® 1017 LDPE (MI 7.0 g/10 min), with no nucleating agent (NA) added to the core. This Comparative Example was to test the effect of an amount of low density polyethylene (LDPE) in the core layer alone without the nucleating agent as the Milliken Hyperform® masterbatch used LDPE as a carrier resin.

The OHDPE films were then tested for haze, gloss, mechanical properties (modulus), heat seal properties (seal strength at various sealing temperatures, SIT), and thermal properties (crystallization temperature, crystallization onset temperature, heat of crystallization, melting temperature, melting onset temperature, heat of fusion) as described in the "Test Methods" section.

The following Table 1 illustrates the properties of these examples:

TABLE 1

| Example | Haze % | Gloss | Modulus MD/TD kpsi | Seal Initiation Temperature ° F. | Heat Seal Strength @ 200 F. g/in | Heat Seal Strength @ 240 F. g/in | Heat Seal Strength @ 260 F. g/in |
| --- | --- | --- | --- | --- | --- | --- | --- |
| Ex. 1 - control | 54 | 5 | 245/595 | 205 | 174 | 352 | 325 |
| Ex. 2 - 2% Nucleating Agent in core | 32 | 8 | 295/525 | 175 | 292 | 420 | 837 |
| Ex. 3 - 2% Nucleating Agent in core different HS layer | 42 | 11 | 250/403 | 187 | 235 | 609 | 1070 |
| CEx. 1 - LDPE in core no Nucelating Agent | 62 | 7 | 307/536 | 212 | 162 | 393 | 469 |

| Example | Heat Seat Strength @ 290 F. g/in: | Crystallization Temperature ° C. | Crystallization Onset Temperature ° C. | Heat of Crystallization J/g | Melting Temperature ° C. | Melting Onset Temperature ° C. | Heat of Fusion J/g |
| --- | --- | --- | --- | --- | --- | --- | --- |
| Ex. 1 - control | 425 | 118.79 | 119.61 | 201.0 | 131.49 | 123.07 | 195.9 |
| Ex. 2 - 2% Nucleating Agent in core | 1140 | 120.29 | 121.73 | 201.9 | 131.58 | 121.73 | 202.0 |
| Ex. 3 - 2% Nucleating Agent in core different HS layer | 1147 | 120.32 | 121.72 | 199.6 | 131.54 | 121.26 | 209.5 |
| CEx. 1 - LDPE in core no Nucelating Agent | 332 | 119.04 | 119.63 | 196.9 | 131.13 | 122.92 | 207.9 |

As Table 1 shows, Example 1 (Ex 1), which is a control film of a biaxially oriented HDPE film made on a 1.5 m pilot sequential orientation line, showed a sealing initiation temperature (SIT) of 205° F. Sealing initiation temperature (SIT) is considered the temperature at which the heat seal strength is 200 g/inch. Typical heat seal strengths are reported at 200° F., 240° F., 260° F. and 290° F.

Comparative Example 1 (CEx 1), which is a film of a biaxially oriented HDPE film using 2 wt % LDPE (no nucleating agent) in the core layer (B) showed a sealing initiation temperature (SIT) of 212° F., which is not lower than the SIT of Example 1 (Ex 1), which is the control film. The LDPE used in this case is of similar MI of the LDPE carrier of the nucleating agent used on Examples 2 and 3 (Ex 2 and Ex 3), and it was used to demonstrate that the improved properties of the heat seal layer (C) observed in this invention were not caused by the LDPE carrier added to the core layer (B). Addition of neat LDPE in the core layer (B), without the nucleating agent (NA), did not cause reduction in the sealing initiation temperature (SIT), nor enabled higher heat seal strength when compared to Example 1 (Ex 1), which is the control film.

Examples 2 and 3 (Ex 2 and Ex 3) added 2 wt % of the nucleating agent (NA) masterbatch in the HDPE core layer (B) of the co-extruded film, but each had a different heat seal layer (C) composition. Both Examples 2 and 3 showed a substantial reduction in the sealing initiation temperature (SIT)—175° F. and 187° F. respectively vs. 205° F. for Example 1 (Ex 1), which is the control film. Both Examples 2 and 3 also showed stronger heat seal strengths at 200° F., 240° F., 260° F. and 290° F. when compared to both Example 1 (Ex 1) and to Comparative Example 1 (CEx 1). Both Examples 2 and 3 also showed a substantial reduction in haze, a slight increase in gloss, and mechanical properties comparable to Example 1 (Ex 1).

In addition, the differential scanning calorimetry analysis of the thermal properties of Examples 2 and 3 show higher crystallization temperature, crystallization onset temperature, heat of crystallization, and heat of fusion; and lower melting onset temperature compared to Example 1 and Comparative Example 1. (Melting point was relatively unaffected.) As discussed previously, it is hypothesized that the higher crystallization temperature properties (accelerated or faster crystallization) of the nucleated Examples 2 and 3 improve the interfacial bonding between the core layer and heat seal layer, providing higher seal strengths; the lower melting onset temperature is hypothesized to aid in a lower SIT of the film and broader seal range.

In conclusion, the use of a nucleating agent in the core layer of a co-extruded heat sealable biaxially-oriented high density polyethylene film can be an effective method to improve the heat seal properties, haze and gloss, without significantly affecting the mechanical properties of the film.

What is claimed is:

1. A multi-layer biaxially oriented heat seal film comprising:
   (a) a first layer comprising a high density polyethylene resin comprising a nucleating agent that increases a crystallization temperature and a crystallization onset temperature of the high density polyethylene resin, and
   (b) a second layer comprising a low density polyethylene resin, wherein the second layer is a heat seal layer, wherein a sealing initiation temperature of the film is below 200° F.,
   wherein the nucleating agent comprises a salt of 1,2-cyclohexanedicarboxylic acid.

2. The film of claim 1, wherein the sealing initiation temperature is below 190° F.

3. The film of claim 1, wherein the sealing initiation temperature is below 180° F.

4. The film of claim 1, wherein the first layer comprises a blend of 2 or more grades of high density polyethylene resins.

5. A multi-layer biaxially oriented heat seal film comprising:
   (a) a first layer comprising a high density polyethylene resin comprising a nucleating agent that increases a crystallization temperature and a crystallization onset temperature of the high density polyethylene resin, and
   (b) a second layer comprising a low density polyethylene resin, wherein the second layer is a heat seal layer, wherein a sealing initiation temperature of the film is below 200° F., wherein the heat seal layer comprises a low density polyethylene resin or a linear low density polyethylene resin blended with a propylene ethylene plastomer resin, an ethylene butene plastomer resin, a propylene ethylene plastomer resin or an ethylene butene plastomer resin.

6. The film of claim 5, wherein the heat seal layer further comprises a linear low density polyethylene resin.

7. The film of claim 5, wherein the heat seal layer further comprises a low density polyethylene resin.

8. The film of claim 5, further comprising additional layers comprising a third layer comprising a polyolefin resin, a metal, or combinations thereof.

9. The film of claim 8, wherein the third layer comprising the polyolefin resin comprises a high density polyethylene resin.

10. The film of claim 9, wherein the third layer comprising the polyolefin resin comprises a blend of 2 or more grades of high density polyethylene resins.

11. The film of claim 5, wherein the film has a film thickness of about 70G.

12. The film of claim 5, wherein heat seal layer has a heat seal strength at 200° F. of 180 g/in or more.

13. The film of claim 5, wherein the nucleating agent comprises zinc stearate.

14. The film of claim 5, wherein the nucleating agent comprises a salt of 1,2-cyclohexanedicarboxylic acid.

15. A multi-layer biaxially oriented heat seal film comprising:
   (a) a first layer comprising a high density polyethylene resin comprising a nucleating agent that increases a crystallization temperature by at least 1° C. and a crystallization onset temperature by at least 1° C. of the high density polyethylene resin, and
   (b) a second layer comprising a low density polyethylene resin, wherein the second layer is a heat seal layer,
   wherein the nucleating agent comprises a salt of 1,2-cyclohexanedicarboxylic acid.

16. The film of claim 5, wherein heat seal layer has a heat seal strength at 200° F. of 180 g/in or more.

17. A method of manufacturing of the film of claim 1, comprising operating a sequential or simultaneous manufacturing film-making process.

18. A method of manufacturing of the film of claim 5, comprising operating a sequential or simultaneous film-making process.

* * * * *